United States Patent [19]

Foote

[11] Patent Number: 4,798,051

[45] Date of Patent: Jan. 17, 1989

[54] ROTARY ACTUATOR WITH TAILORED TORQUE OUTPUT

[75] Inventor: Eugene B. Foote, Seattle, Wash.

[73] Assignee: The Boeing Company, Seattle, Wash.

[21] Appl. No.: 208,531

[22] Filed: Jun. 20, 1988

[51] Int. Cl.$^4$ .............................................. F03G 7/06
[52] U.S. Cl. ...................................... 60/527; 60/529
[58] Field of Search ........................... 60/527, 528, 529

[56] References Cited

U.S. PATENT DOCUMENTS 3,381,469  5/1968  Schwartz ............................. 60/527

Primary Examiner—Allen M. Ostrager

Attorney, Agent, or Firm—Finnegan, Henderson, Farabow, Garrett, & Dunner

[57] ABSTRACT

A rotary actuator with tailored torque output comprises a shape memory alloy rod or tube encased within or filled with a burnable chemical grain. In its initial state, the rod or tube has zero degree rotation about its longitudinal axis. The rod or tube is then rotated or twisted about its longitudinal axis when the shape memory alloy is in a malleable state. The rod or tube may be progressively, selectively heated by the burning of the chemical grain to cause the shape memory alloy to return locally to its original shape with the consequence that a free end of the rod or tube is rotated.

11 Claims, 1 Drawing Sheet

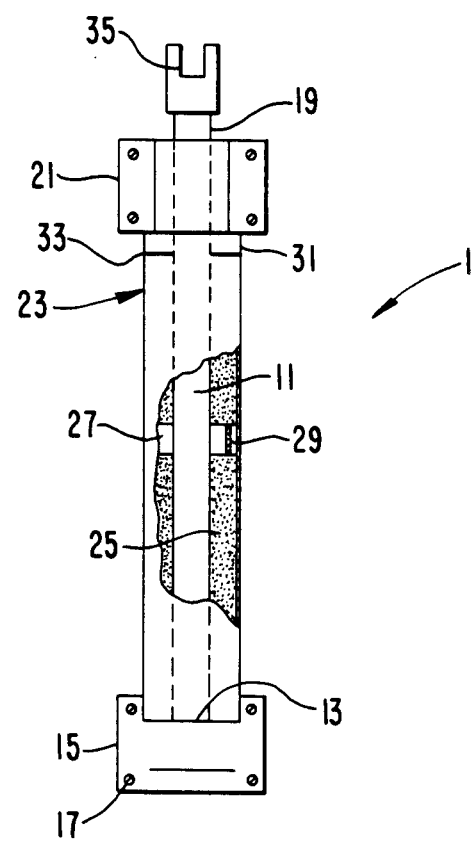

ROTARY ACTUATOR WITH TAILORED TORQUE OUTPUT

FIELD OF THE INVENTION

The present invention relates to a rotary actuator with taiored torque output and, more particularly, to a rotary actuator wherein a rod formed of a shape memory alloy such as 55-Nitinol, is formed into an initial shape, subsequently twisted about its longitudinal axis, and may be selectively heated to cause the rod to rotate about its longitudinal axis to return to the initial shape.

BACKGROUND OF THE INVENTION

A group of metals known as shape memory alloys exhibit a property that when a member formed from such a metal is deformed while below a martensite finished temperature and then is heated to above an austenite temperature, the member returns to the shape existing before the deformation. A well-known shape memory alloy is 55-Nitinol, which is an alloy of nickel and titanium. The use of Nitinol in a heat engine is described in Ginell et al., Nitinol Heat Engines for Low-Grade Thermal Energy Conversion, Mechanical Engineering (May 1979), pp. 28–33. Other applications of shape memory alloys have been disclosed in issued patents. For example, U.S. Pat. No. 4,700,541 issued to Gabriel et al. discloses an electrically-controlled shape memory alloy actuator wherein a wire made of shape memory alloy has its ends constrained against movement and is caused to rotate by the selective application of voltages to different sections of the wire.

U.S. Pat. No. 4,010,455 issued to Stange discloses a thermally-powered rotary actuator that is used for positioning a rotatable shaft in first and second positions disposed 180° apart. The actuator incorporates heat extensible springs formed from 55-Nitinol to apply clockwise or counterclockwise torque to a shaft upon the selective heating of one or the other of the springs.

A mechanical actuator employing Nitinol is also disclosed in U.S. Pat. No. 4,553,393 issued to Ruoff. The actuator of Ruoff is an electro-mechanical servo control system wherein a combination of parallel elements formed from Nitinol may be selectively, electrically heated under digital control to regulate the degree of actuating force provided by the Nitinol actuators.

U.S. Pat. No. 4,665,334 issued to Jamieson describes the use of a shape memory alloy, such as Nitinol, in an actuator to produce rotary motion in the manner of a stepper motor. The memory metal element is employed to impart a drive motion to a spring clutch that is positioned about a shaft. The alternate heating and cooling of the memory metal element causes the spring clutch to tighten and loosen, respectively, to rotate the shaft through a small angle. The memory actuator is selectively, electrically heated.

While the use of shape memory alloys, such as Nitinol, to provide rotary actuators is known, the prior art devices have primarily relied upon electricity to heat the Nitinol above the austenite temperature. In addition to the actuator, a source of electricity is required as well as a control system for selectively applying the electricity to the Nitinol elements. These requirements complicate the construction of the actuator and cause it to be more expensive to manufacture and less reliable to operate. In addition, if an actuator is provided for a single use, the requirement for an electrical control system may make the actuator unnecessarily expensive. Moreover, if a Nitinol actuator is used in a spacecraft or missile to release latches or to provide rotary power for mechanisms therein, the actuator must be lightweight, dependable, and operate with a high degree of precision.

SUMMARY OF THE INVENTION

An object of the present invention is a rotary actuator made from a shape memory alloy in a manner to provide torque in a pre-selected manner when activated.

Another object of the present invention is a lightweight, inexpensive rotary actuator that uses a Nitinol member to provide rotary power.

Still another object of the present invention is a rotary actuator that uses a Nitinol torsion member that is selectively heated by the burning of chemical grains provided around the Nitinol to cause rotation of one end of the member.

Yet another object of the present invention is a rotary actuator that uses a Nitinol member that is heated by the burning of chemical grain to provide rotary power in a stepped operation.

A further object of the present invention is a rotary actuator that can be tailored to produce motion at any desired speed, torque or angular excursion.

These and other objects are accomplished by a rotary actuator for delivering torque through a selected angle of rotation comprising a torsion member having a longitudinal axis and being made from a shape memory alloy, the torsion member having a 0° rotation about the longitudinal axis when the member is heated to a temperature above a predetermined temperature and a predetermined angular rotation about the longitudinal axis when the member is at a temperature below the predetermined temperature, and heat generating material being of variable, predetermined burn rate surrounding or enclosed within the torsion member to selectively heat successive portions of the member to a temperature above the predetermined temperature to cause the member to rotate about the longitudinal axis.

BRIEF DESCRIPTION OF THE DRAWING

The manner by which the above objects and other objects, features, and advantages of the present invention are obtained will be fully apparent from the following detailed description when considered in view of the drawing figure that shows a partial cross section of the rotary actuator of the present invention.

DETAILED DESCRIPTION

In the figure, a rotary actuator 1 includes an elongated member 11, such as a rod or a tube, formed of shape memory alloy such as 55-Nitinol. The member 11 is fixed at a first end 13 to a mounting block 15. The mounting block 15 may be secured to a support (not shown) by appropriate fasteners 17. The purpose of the mounting block 15 and the fasteners 17 is to retain the end 13 of the member 11 fixed against rotation. The member 11 has a second end 19 rotatably mounted in a bearing block 21. The end 19 is adapted to be connected to an element that is to be rotatably driven.

As formed, the member 11 has 0° rotation about its longitudinal axis. When fixed to the mounting block 15 at a temperature below the martensite finished temperature, the member 11 is malleable and may be twisted, i.e., rotated about the longitudinal axis through a selected angle. As long as the member 11 is not heated to a temperature above the austenite temperature, it will remain in the twisted shape.

The member 11 is enclosed within a casing 23. The casing 23 may be made of stainless steel and is used to enclose a chemical grain 25 that is provided, e.g., packed, around the member 11. The chemical grain may constitute a propellant as commonly used in a solid propellant motor and burned to produce gas and heat. The chemical grain could also be selected from grains used in ordnance devices. The chemical grain may be mixed to form a slurry and then poured around the member 11 (and inside the member 11 if it is tubular) inside of the casing 23. Other chemical grains are known which are machinable to fit around the member 11.

A two step actuator can be built by dividing the chemical grain into two or more sections separated by appropriate nonflammable separator elements 27. Each separator element 27 includes a chemical timer connecting adjacent sections of the chemical grain. As shown in the figure, a chemical timer comprises a bore 29 formed in the separator 27 and packed with the chemical grain. Assuming that the chemical grain is first ignited near the end 19 of the member 11, it will burn in the direction of the separator 27 and then ignite the chemical grain in the bore 29. After the chemical grain in the bore 29 has been burned, the lower portion of the chemical grain 25 will be ignited and the chemical grain will continue to burn in the direction of the end 13 of the member 11, thus initiating the second step of the actuation. A suitable vent 31 is provided near the end 19 of the member 11 to enable the gas generated by the burning of the chemical grain to be discharged and prevent pressurization within the casing 23.

Also shown in the figure is an electrically-activated squib 33 provided to ignite the chemical grain. The squib 33 is preferably provided if the chemical grain 25 is not easily ignited by the direct application of a small electrical current.

The chemical grain 25 is first preferably ignited at the end that will rotate. The portion of the member 11 located at the burn location of the chemical grain 25 will pass above the austenite temperature and that portion of the member 11 will return to the state of zero rotation about the longitudinal axis of the member 11. Thus, as the chemical grain burns from the vent 31 toward the fixed end 13 of the member 11, rotation of the shape memory alloy member 11 will occur at the location of the burn point and not within the chemical grain 25 between the burn point and the fixed end 13. It is preferable that the chemical grain not be disturbed by the rotation of the member to prevent a gap from being formed between the member 11 and the chemical grain 25 and also that the chemical grain 25 not be disturbed by rotation of the member 11 which would cause the burn rate of the chemical grain to become less predictable. It is possible, however, that the chemical grain could be ignited at the fixed end 13 and burn toward the rotatable end 19 if a sheath were provided between the member 11 and the chemical grain 25 such that the member 11 could rotate without disturbing the chemical grain. Moreover, a vent would be required in the casing 23 near the end 13 of the member 11.

In operation, the squib 33 is electrically activated to ignite the chemical grain 25 in the upper portion of the stainless steel casing 23. As the chemical grain 25 burns, it causes localized heating of the member 11 and causes the local heated portion of the member to resume the shape existing before the deformation of the member caused by longitudinal twisting. As the local area of the member 11 resumes its original orientation a spline 35 will be rotated accordingly. The rotation of the spline 35 continues as the burn area of the chemical grain 25 proceeds in a direction away from the rotatable end 19 of the member 11. When the chemical grain above the separator 27 is fully consumed, rotation of the member 11 will cease until the burn front has passed through the chemical timer grain provided in the bore 29. This provides a delay between the first and second stage of actuation (if desired). The chemical grain 25 in the lower portion of the casing 23 will then be ignited and the spline 35 will be caused to rotate again until the chemical grain is fully consumed. If the burn rate of the chemical grain 25 in the upper and lower portions of the casing 23 are different the member 11 will rotate at different rates.

As embodied herein, a Nitinol torsion member (rod or tube) is plastically deformed to some angle after having been set at a 0° deflection. When the member is heated to its activation temperature, i.e., above the austenite temperature, the member returns to the initial position to provide torque to a spline that may be used to actuate a latch or an electrical switch, drive a gear train, etc. The Nitinol member is heated by the burning of a chemical grain that is packed around or within the member. The rate of release of the rotary energy stored in the deformed member can be controlled by selecting the burn rate of the chemical grain and by incorporating appropriate chemical timers and inflammable separators to separate contiguous portions of the grain. It is also possible to reduce the burn rate of the grain by mixing inert material with the grain. The torque-displacement output of the Nitinol member can be altered by changing its outer (and inner) diameter(s) because the greater the diameter of the rod or tube the greater the torque that can be produced. The length of the member is selected according to the desired travel angle. Moreover, the actuator can be reused by reassembly of the Nitinol member and chemical grain within the appropriate casing.

While a preferred embodiment of the present invention has been described above, it should be understood that numerous modifications can be made to the invention without departing from the spirit and scope thereof. Accordingly, it is intended that the scope of the present invention be defined by the following claims and the equivalents thereof.

What is claimed is:

1. An apparatus for delivering torque through a selected angle of rotation, comprising:
   a torsion member having a longitudinal axis and being made from a shape memory alloy, said member having a zero degree rotation about said longitudinal axis when said member is heated to a temperature above a predetermined temperature and having a predetermined angular rotation about said longitudinal axis when said member is at a temperature below said predetermined temperature; and
   heat generating material surrounding said torsion member to selectively heat successive portions of said member to a temperature above said predetermined temperature to cause said member to rotate about said longitudinal axis in a predetermined fashion.

2. An apparatus according to claim 1, wherein said shape memory alloy comprises an alloy of nickel and titanium.

3. An apparatus according to claim 2, wherein said heat generating material comprises a chemical grain having a predetermined burn rate.

4. An apparatus according to claim 3, further including a nonflammable asing surrounding said chemical grain.

5. An apparatus according to claim 2, wherein said heat generating material comprises a first chemical grain having a first burn rate to cause said member to rotate at a first rotational speed and a second chemical grain having a second burn rate different from said first burn rate to cause said torsion member to rotate at a second rotational speed.

6. An apparatus according to claim 1, wherein said heat generating material comprises a first portion of chemical grain and a second portion of chemical grain, said first and second portions generating heat when burned, and wherein said apparatus further includes a chemical timer between said first portion of chemical grain and said second portion of chemical grain, said chemical timer for establishing a delay between the completion of the burning of said first portion of chemical grain and the initiation of the burning of said second portion of chemical grain.

7. An apparatus according to claim 6, wherein said chemical timer comprises a nonflammable separator between said first portion of chemical grain and said second portion of said chemical grain, said separator having a bore therethrough filled with chemical grain in an amount insufficient to heat said torsion member to a temperature above said predetermined temperature.

8. An apparatus according to claim 1, further including an electrically activated squib for igniting said heat generating material.

9. An apparatus according to claim 1, further including a mounting block and a bearing block, and wherein said torsion member includes a non-rotatable end fixed to said mounting block and a rotatable end mounted for rotation within said bearing block.

10. A rotary actuator, comprising:
   a shape memory alloy rod twisted about a longitudinal axis, said rod having a non-rotatable end and a rotatable end, said rod for rotating about the longitudinal axis thereof to rotate said rotatable end when heated to a temperature above a predetermined temperature; and
   heat generating material provided around said rod, said heat generating material adapted to be burned from a first end to a second end to successively heat the rod to a temperature above said predetermined temperature to cause said rod to rotate as said heat generating material burns from said first end to said second end.

11. A method for delivering torque through a selected angle of rotation, comprising the steps of:
   providing a torsion member having a longitudinal axis and being made from a shape memory alloy, said member having a zero degree rotation about the longitudinal axis when the member is heated to a temperature above a predetermined temperature;
   securing an end of the torsion member against rotation;
   twisting the torsion member about the longitudinal axis;
   providing heat generating material around the member; and
   igniting the heat generating material at a first end such that the material burns to a second end to successively heat the member to a temperature above the predetermined temperature to cause the member to rotate as the heat generating material burns from the first end to the second end thereof.

* * * * *